July 18, 1950

A. T. BRUNNER 2,515,368

FURROW OPENER AND FERTILIZER
TUBE ATTACHMENT FOR PLANTERS

Filed Aug. 13, 1945

INVENTOR.
ANTHONY T. BRUNNER.
BY
Boyken, Mohler & Beckley
ATTORNEYS

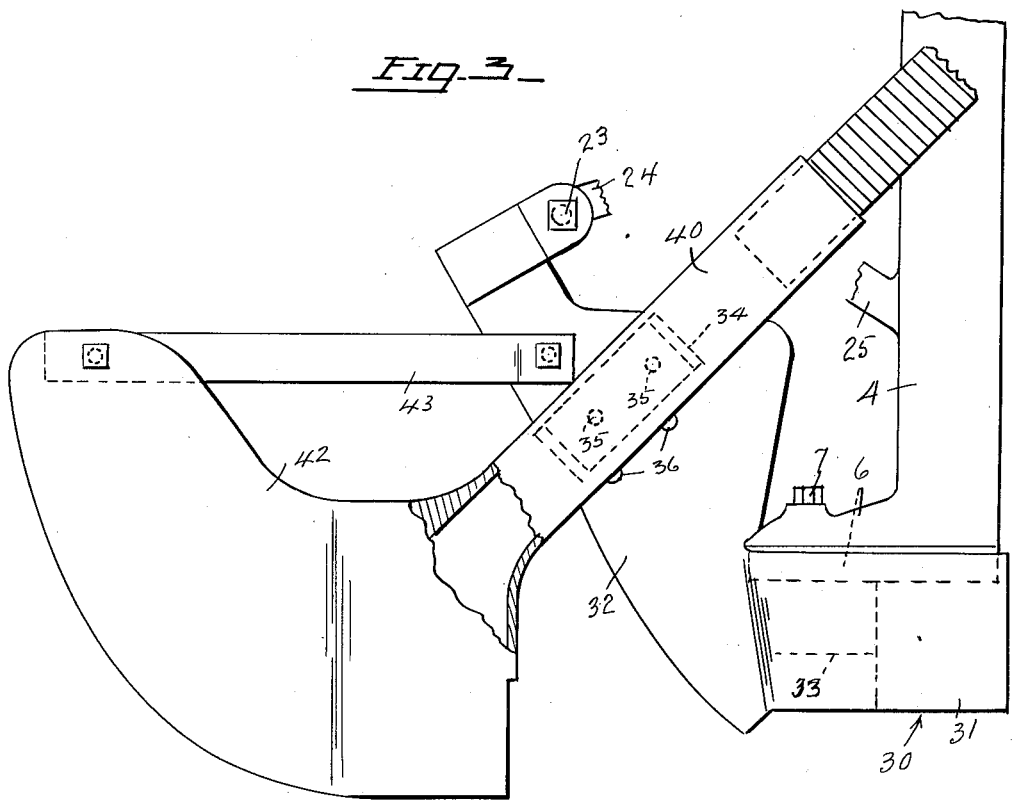
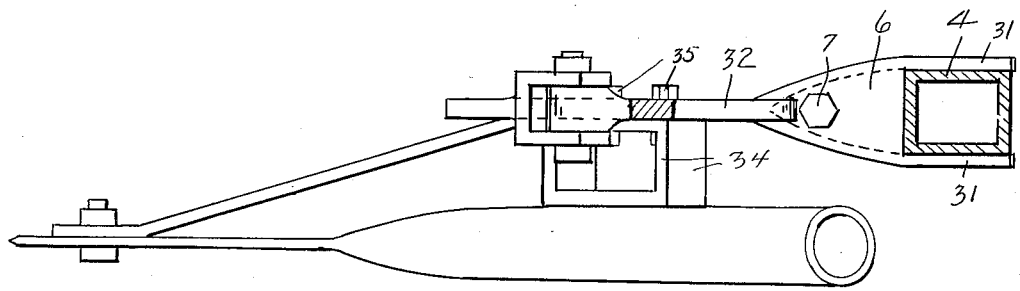

Patented July 18, 1950

2,515,368

UNITED STATES PATENT OFFICE 2,515,368

FURROW OPENER AND FERTILIZER TUBE ATTACHMENT FOR PLANTERS

Anthony T. Brunner, Half Moon Bay, Calif.

Application August 13, 1945, Serial No. 610,427

4 Claims. (Cl. 111—73)

This invention relates to a fertilizer distributor for use with a conventional standard seed planter of the type having seed hoppers and seed tubes leading from such hoppers into the ground.

Seed planters of the conventional type have a pair of coaxial ground wheels supporting a frame thereon and which frame usually includes a pair of horizontally extending frame members that are disposed on a horizontal plane and that extend transversely of the normal forward movement of the planter and ahead of the wheels so that their ends are in front of the latter. Seed hoppers are usually carried on these frame members above them while fertilizer containers, where used, are elevated above the seed hoppers and rearwardly thereof to be more nearly over the axle of the wheels.

One of the objects of this invention is the provision of an attachment for a planter of the above type that is adapted to be easily and quickly secured to the planter in a position for depositing fertilizer ahead of the discharge end of the seed tube and to one side of said end and below the level of said end and which attachment may be connected with the conventional flexible conduit that normally extends downwardly from the fertilizer container without difficulty.

Another object of the invention is the provision of an attachment for a planter that is a unitary device including a furrow opener for securement to the seed tube as well as a furrow opener and fertilizer tube for the fertilizer and which device is adapted to position fertilizer in the ground at a level below that of the seed and in advance of and to one side of such seed.

A still further object of the invention is the combination of a fertilizer distributor and seed furrow opener with a standard planter of the type described above without alteration of said planter and which device is adapted for securement to the planter at the foot of the seed tube and at the frame in advance of such foot and above the latter and which distributor when on such planter is adapted to deposit fertilizer in the ground at a level below that of the seed and in advance of and to one side of such seed.

Other objects and advantages will appear in the description and in the drawings.

In the drawings, Fig. 1 is an elevational view of one form of attachment, part of a conventional planter being shown with part of the frame and seed tube in section.

Fig. 4 is a top plan view of the attachment of Fig. 3 with the conventional seed tube being shown in section.

Fig. 5 is a reduced and simplified elevational view of a conventional planter with the device of Fig. 1 thereon.

Figure 1:
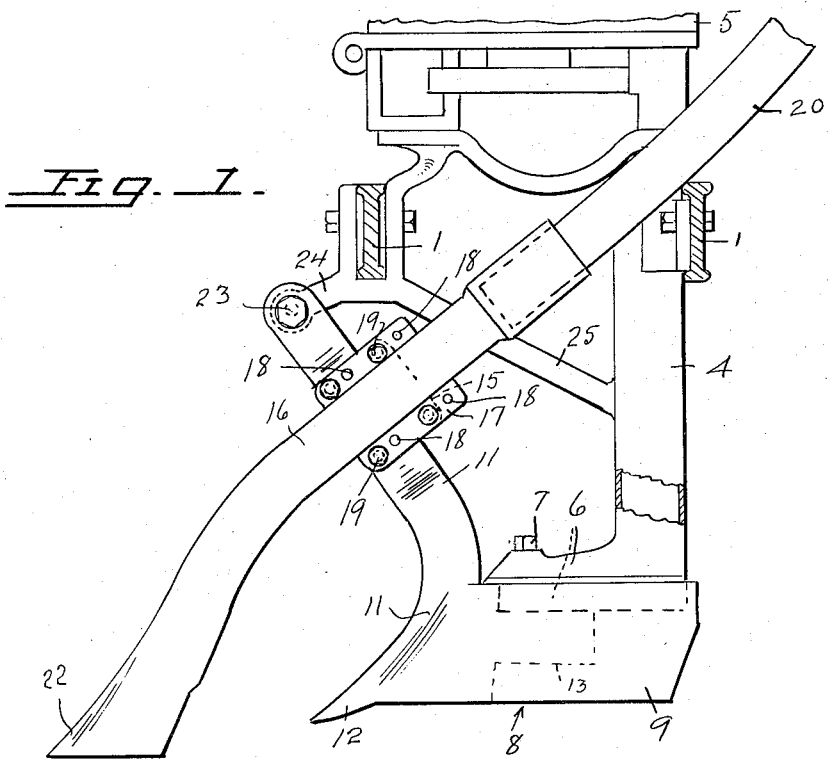

In detail a conventional planter is provided with a frame that includes a pair of horizontally elongated parallel frame members 1 (Figs. 1, 5) that extend transversely of the normal forward direction of travel of the planter and in front of the wheels 2 of the planter. The planter of the type indicated in Fig. 5 has a pair of coaxial ground wheels 2 (only the near wheel being shown) and a drawbar 3. A vertically extending seed tube 4 is carried by said frame members in advance of each of the ground wheels 2 and there may be one or more pairs of such tubes on each planter with a seed container 5 above each tube for supplying seed to the latter in the usual way. Each seed tube has a foot 6 at its lower end that is adapted to be secured by bolt 7 to any desired plow or furrow opener.

The attachment of this invention comprises a furrow opener 8 in the form of a pair of horizontally elongated vertically disposed plates 9 that are integrally secured at their forward edges to a cutter blade 11.

Blade 11 may be formed with a plow-like extension 12 projecting downwardly from the lower forward ends of plates 9 and in downward extension of blade 11. Also blade 11 extends upwardly from the forward ends of plates 9 and forwardly and at the same time laterally to a point adjacent the forward frame member 1 of the planter when the foot 6 of seed tube 4 is between the plates 9.

The said plates 9 extend divergently rearwardly from the blade 11 and past opposite sides of the foot 6 that is on said seed tube, and a web 13 secured to plates 9 below foot 6 may be threaded to receive bolt 7 for securing said foot to the plates. The lower end of tube 4 being open will discharge the seed rearwardly of web 13 and foot 6 for dropping into the furrow opened by plates 9.

Figure 2:
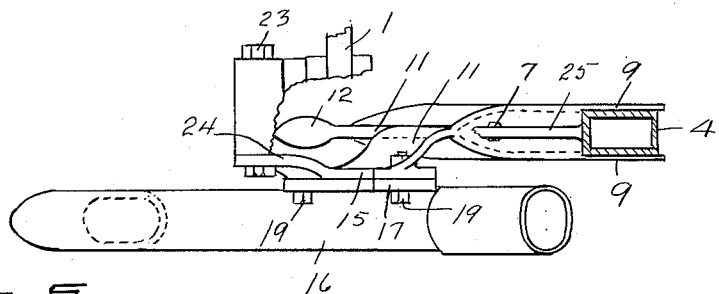
Fig. 2 is a top plan view of the attachment of Fig. 1 with the seed tube being in section.

In the particular form of attachment shown in Figs. 1, 2 the cutter blade 11 extends rearwardly from extension 12 and then forwardly from a point adjacent the upper edges of plates 9 and said blade is formed with a flat bolting plate 15 at the point where the same is laterally offset, which bolting plate is vertically disposed with a flat side directed laterally and outwardly of said offset portion for securement of a somewhat similar plate thereto.

A fertilizer tube 16 carries such similar plate 17 thereon and rigid therewith for bolting to the plate 15. Said plate 17 may be provided with extra holes 18 for adjusting the tube 16 generally vertically and in direction longitudinally of tube 16. Bolts 19 secure plates 15, 17 together.

The said fertilizer tube 16 is preferably inclined substantially relative to vertical with its upper open end above foot 6 or the opener 8 while the forward lower end of said tube 16 is at a level below that of the furrow opener 8 and in advance of said opener and offset to one side of the latter. This inclination of said tube 16 not only facilitates opening a furrow for the fertilizer in relatively hard ground but also directs the upper end toward the flexible conduit 20 that extends to the fertilizer container 21. Container 21 is supported on the planter frame above and rearwardly of the seed container.

The forward lower end portion of tube 16 may be slightly more vertical than the remainder of the tube but said forward lower portion is still decidedly inclined and said lower portion may be formed on its forward side with a plow 22.

By the above construction it will be seen that the tube 16 and blade 11 cross each other almost at right angles to each other and the plates 15, 17 are at the points of intersection.

The forward upper end of the blade 11 is secured by a bolt 23 to a bracket member 24 that is in turn secured to the forward frame member 1 of the said pair of frame members. This bracket member 24 is a conventional part of the planter as is a brace 25 that extends from the seed tube 4 upwardly to said forward frame member 1, which brace is integral with the seed tube and may also be integral with the member 24.

This double securement of the device of this invention to the foot 6 of the seed tube and to the forward frame member 1 of the pair of said members through the conventional bracket member 24 provides a simple easy and very rigid support for the fertilizer tube, which is very important in that it enables the user to quickly install the fertilizer tube and to remove it as desired, and it also insures against bending or breaking of the attachment should the planter be turned while the fertilizer tube is in the ground.

Figure 3:
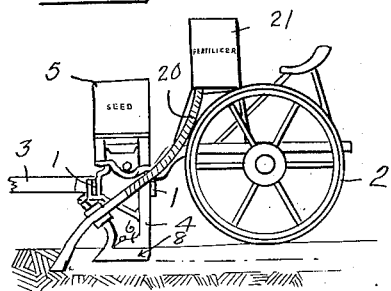
Fig. 3 is an elevational view of a form of attachment most suitable for planting certain seed such as cotton.

In the form of attachment shown in Figs. 3, 4 the furrow opener 30 comprises a pair of vertically disposed plates 31 that are integrally secured at their forward edges to a vertically extending cutter blade 32 and which plates extend divergently past the foot 6 of the seed tube 4. A web 33 between plates 31 is for securement of bolt 7 thereto.

In this instance the blade 32 is relatively wide and instead of being offset laterally intermediate its ends, a spacer 34 is positioned alongside one side of said blade and is integrally secured to the blade by bolts 35. Extra holes 36 may be formed in said blade for vertical adjustment of the fertilizer tube as will be explained later.

The forward cutting edge of blade 32 extends slantingly upwardly and forwardly from the lower forward ends of plates 31 to practically the upper end of the blade where the latter is bolted by bolt 23 to member 24.

Fertilizer tube 40 extends slantingly upwardly from its forward end so that its upper rear end is over the opener 30 while its lower forward end is below the level of the discharge opening in seed tube 4 and is offset to one side of said tube and forwardly thereof. However, the lower forward end of said fertilizer tube is formed with a cutter blade 42 that extends forwardly and upwardly from said fertilizer tube and the upper end of said blade is connected with blade 32 by a link 43 that is pivotally secured at its opposite ends to both blades 32, 42.

The spacer 34 is preferably welded to one side of tube 40 thus laterally offsetting the tube 40 as above explained.

I am aware of the fact that heretofore machines have been disclosed in which the fertilizer has been deposited at opposite sides of the row of seeds and behind the seed, but in such instances the fertilizer is not covered as occurs where the fertilizer is deposited ahead of the seed, nor in such instances is the fertilizer depositing device and seed furrow opener a unit adapted to be secured to the planter in the manner provided for by me. The present attachment is designed to be quickly secured to a conventional planter and removed therefrom without requiring alteration of the planter, and the attachment when secured in place is rigid under operating conditions which includes turning of the planter even though the seed tube and fertilizer tube should be lifted out of the ground at such times.

I claim:

1. An attachment for a planter having a vertically extending feed tube provided with a forwardly directed foot with respect to the forward movement of the planter comprising, a furrow opener, means for removably securing said furrow opener to said foot at a point ahead of the lower open end of said tube with the furrow opener projecting forwardly from said foot, an upwardly and forwardly extending extension on said furrow opener provided with means at its upper end for bolting the same to the frame of a planter, an upwardly and rearwardly extending fertilizer tube removably secured directly to said extension at one lateral side thereof, the lower end of said fertilizer tube being positioned substantially in advance of the lower end of said seed tube and to one side of the latter relative to the direction of travel of said tube, the lower forward end of said fertilizer tube being at a level below the lower end of said seed tube.

2. An attachment for a planter having a frame supporting a generally vertically extending seed tube thereon comprising: a furrow opener including means for removably securing the same to the lower end of said seed tube, a brace rigid with said furrow opener extending upwardly and forwardly thereof relative to the direction of travel of said planter when said furrow opener is on said seed tube, means at the upper end of said brace for removably securing said brace to said frame, an inclined fertilizer tube extending upwardly and angularly across one side of said brace at a point between said upper end of said brace and said furrow opener, means for removably securing said fertilizer tube to said brace at said point with the lower end of said fertilizer tube forwardly of said furrow opener relative to said direction of travel and at a level below that of the lower end of said seed tube and offset laterally to one side of the plane in which said furrow opener is adapted to move when said planter is moved in said direction of travel.

3. An attachment for a planter having a frame supporting a generally vertically extending seed tube thereon comprising: a furrow opener including means for removably securing the same to the lower end of said seed tube, a brace rigid with said furrow opener extending upwardly and forwardly thereof relative to the direction of travel of said planter when said furrow opener is on said seed tube, means at the upper end of said brace for removably securing said brace to said frame, an inclined fertilizer tube extending upwardly and angularly across one side of said brace at a point between said upper end of said brace and said furrow opener, means for removably securing said fertilizer tube to said brace at said point with the lower end of said fertilizer tube forwardly of said furrow opener relative to said direction of travel and at a level below that of the lower end of said seed tube and offset laterally to one side of the plane in which said furrow opener is adapted to move when said planter is moved in said direction of travel, said means for securing said fertilizer tube to said brace composing parallel plates respectively carried by said fertilizer tube and said brace, and bolts for securing said plates together in different positions in their respective planes.

4. An attachment for a planter having a frame supporting a generally vertically extending seed tube thereon comprising: a furrow opener including means for removably securing the same to the lower end of said seed tube, a brace rigid with said furrow opener extending upwardly and forwardly thereof relative to the direction of travel of said planter when said furrow opener is on said seed tube, means at the upper end of said brace for removably securing said brace to said frame, an inclined fertilizer tube extending upwardly and angularly across one side of said brace at a point between said upper end of said brace and said furrow opener, means for removably securing said fertilizer tube to said brace at said point with the lower end of said fertilizer tube forwardly of said furrow opener relative to said direction of travel and at a level below that of the lower end of said seed tube and offset laterally to one side of the plane in which said furrow opener is adapted to move when said planter is moved in said direction of travel, said brace having a forwardly directed cutting edge relative to said direction of travel, and the angular relationship between said brace and said fertilizer tube at said point being substantially a right angle.

ANTHONY T. BRUNNER.

REFERENCES CITED

The following references are of record in the file of this patent:

UNITED STATES PATENTS

| Number | Name | Date |
|---|---|---|
| 362,943 | Daniels | May 17, 1887 |
| 1,006,771 | Metzler | Oct. 24, 1911 |
| 1,229,194 | Patric | June 5, 1917 |
| 1,229,604 | Garst | June 12, 1917 |
| 1,473,297 | Knight | Nov. 6, 1923 |
| 1,905,767 | Traphagen | Apr. 25, 1933 |
| 2,058,539 | Welty et al. | Oct. 27, 1936 |
| 2,159,652 | Brunner | May 23, 1939 |
| 2,341,795 | Kriegbaum et al. | Feb. 15, 1944 |

FOREIGN PATENTS

| Number | Country | Date |
|---|---|---|
| 119,027 | Australia | Oct. 3, 1944 |